No. 720,288. PATENTED FEB. 10, 1903.
O. L. SCOTT.
FRUIT PITTER.
APPLICATION FILED JUNE 4, 1902.
NO MODEL.

WITNESSES:

INVENTOR.
Oliver L. Scott
BY
Dewey Strong &Co
ATTORNEYS

UNITED STATES PATENT OFFICE.

OLIVER L. SCOTT, OF SAN FRANCISCO, CALIFORNIA.

FRUIT-PITTER.

SPECIFICATION forming part of Letters Patent No. 720,288, dated February 10, 1903.

Application filed June 4, 1902. Serial No. 110,178. (No model.)

*To all whom it may concern:*

Be it known that I, OLIVER L. SCOTT, a citizen of the United States, residing in the city and county of San Francisco, State of California, have invented an Improvement in Fruit-Pitters; and I hereby declare the following to be a full, clear, and exact description of the same.

My invention relates to a device for removing the pits from fruit.

It consists of a circular revoluble disk having an eccentrically-formed opening made through it adapted to receive the fruit, and elastic cutting-blades are fixed in one side of the opening, so that when the fruit is placed within the opening these blades are inserted upon each side of the pit, the outline of which they follow. The edge of the opening forms a blade which splits the fruit, and means are provided for revolving the disk upon its supporting-guide, so that the fruit being held while the disk is revolved the inner edge of the opening will cut the fruit around the pit, while the blades follow the outline of the pit and sever the meat therefrom.

My invention also comprises details of construction, which will be more fully explained by reference to the accompanying drawings, in which—

Figure 1:
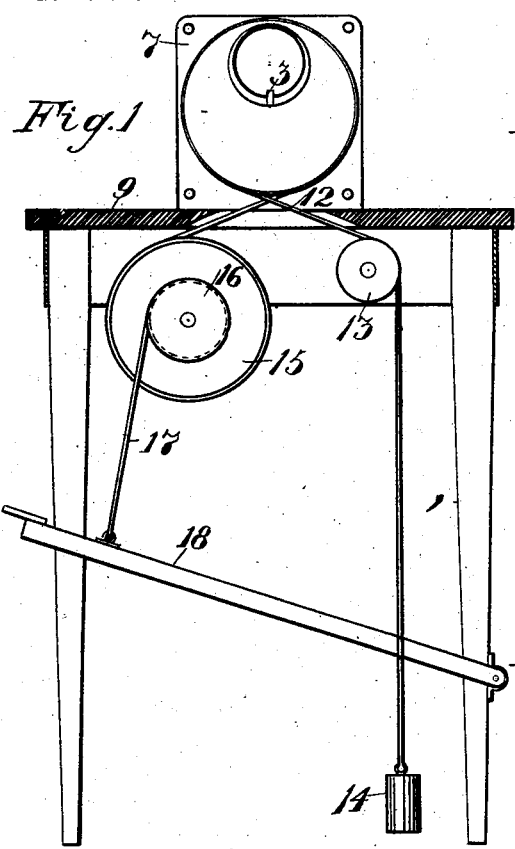
Figure 5:
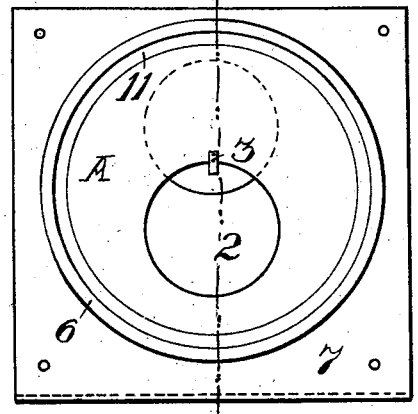
Figure 4:
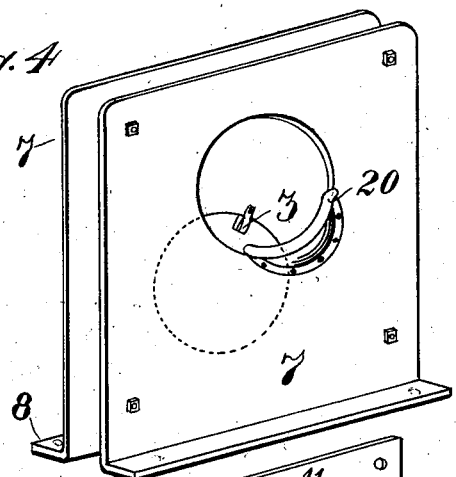
Figure 2:
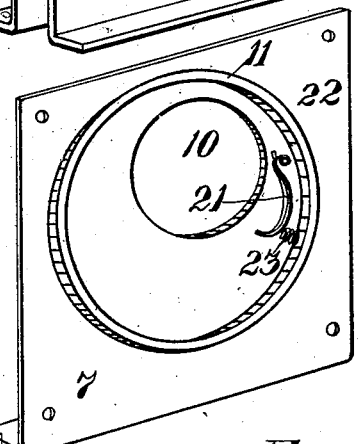
Figure 6:
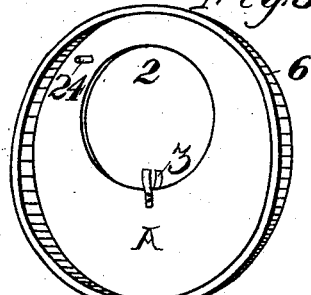
Figure 3:
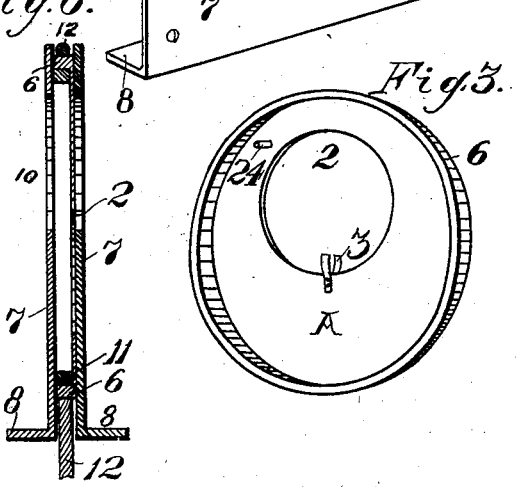

Figure 1 is a side elevation of the apparatus and treadle mechanism. Fig. 2 is a view of one stationary side with pit-ejector. Fig. 3 is a perspective view of the disk with blades and guide-flanges. Fig. 4 shows the stationary side plates with inclosed disk and pitting-blades and exterior fruit-supports. Fig. 5 is a side elevation of side plates, disk, and knives. Fig. 6 is a cross-sectional view on the line *xx* of Fig. 5, showing the second plate 7 in position and a portion of the band 12.

The object of this device is to provide a means for rapidly splitting fruit having pits, such as peaches and the like, and at the same time separating the meat from the pit.

As here shown, A is a thin metal disk having a circular opening 2 made through it at one side of the center, and 3 represents elastic sharp-edged blades riveted or otherwise secured upon each side of the plate, so that their ends project into the opening 2.

The disk A has an annular flange 6 projecting from one side, and this provides a means for guiding and revolving the parts, as follows: 7 7 are plates having flanges at the bottom, as at 8, by which they may be secured upon a table or other support. These plates 7 stand vertically upon the table and have also openings 10 made through them to correspond with the opening 2 of the disk A, which is revoluble between the plates 7. One of the plates 7 has an annular flange 11 projecting from its face and eccentric to the opening 10, so that the annular flange 6 of the plate A may fit over the flange 11, the latter serving as a guide and support for the disk A and allowing the disk A to be revolved between the supporting-plates 7.

The revolution of the disk A is effected by means of a band 12 of any suitable flexible material, made of such width as to pass around the outside of the flange or rim 6. Thence it crosses below the disk, and one part passing over a pulley 13 carries a weight 14. The other part is fixed to a pulley 15, journaled below the table 9, and by means of a second eccentric pulley 16 and a flexible strap 17, attached to it and connected with a treadle-lever 18, the operator may by placing his feet upon the end of this lever and depressing it wind the band 12 around the pulley 15, the weighted end rising in unison with the downward movement of the treadle, and this acts to revolve the disk 6.

The operation will then be as follows: The fruit is taken by the operator and placed within the opening 2 of the disk A, the stem end nearest to which the pit lies being forced down against the elastic blades 3. This action causes the blades to penetrate the end of the fruit, and by reason of their elasticity and curvature they follow around opposite sides of the pit until the fruit is seated upon the edge of the disk A. By pressing upon the treadle the disk will now be revolved and its edge will follow around a central line of the fruit, cutting the meat through to the pit, while the blades 3, moving in unison with the disk, will follow the outline of the pit, separating the meat from it, so that the two halves may be thrust into a receptacle, the pit falling away.

By releasing the pressure upon the treadle the weight 14 or an equivalent spring will return the parts to their normal position ready to receive another fruit.

In order to support the fruit as it is held between the fingers and while the disk A is revolved, I fix upon each side of the openings in the stationary plates 7 a piece of rubber or other suitable material 20, as shown in Fig. 4.

In order to discharge the pit by a positive movement, an arm 21 is pivoted to the plate 7 at 22, so that one end is movable substantially in line with the pit. A spring 23 holds this arm away from the edge of the opening 2 while the disk A is being revolved to split the fruit and separate it from the pit. When the disk A returns, a pin or lug 24 on A contacts with the short end of the arm 21 and causes it to turn on its pivot, so that the opposite end will be forced to strike and eject the pit.

This device is especially adapted for pitting fruit, such as clingstone peaches, in which the meat is strongly adherent to the pit.

The elastic support 20 prevents bruising of the fruit and offers a firm resilient support for the fruit to be held upon while the pitting is being effected.

Having thus described my invention, what I claim, and desire to secure by Letters Patent, is—

1. A device for pitting fruit consisting of a circular disk having an opening made through it at one side of the center, elastic curved blades fixed to project into the opening and to encircle the pit when the fruit is introduced, and means by which the disk is revolved around the fruit while the latter is held in position.

2. A device for pitting fruit consisting of a disk having a hole made through it at one side of the center, curved elastic blades fixed and projecting into the opening so as to enter the fruit and follow the outline of the pit when the fruit is introduced, a carrier within which the plate is supported, said carrier having a corresponding eccentrically-placed opening made through it, an annular ring or flange upon which said disk is revoluble and means by which it may be revolved.

3. A fruit-pitting device consisting of a thin metal disk having a circular hole made through it at one side of the center, blades fixed and projecting into the opening so as to fit around the pit when the fruit is pressed upon the blades and held in place, said blades having a cutting edge to split the fruit, a guide for the disk and means by which the disk is revolved around the fruit while the latter is held whereby the fruit is split and the meat is separated from the pit.

4. A device for pitting fruit consisting of a circular metal disk having a circular hole made through it at one side of the center, said hole having a sharpened edge and elastic curved blades fixed and projecting into the hole so as to fit around the pit when the fruit is inserted, and a circular rim or flange, a vertically-fixed plate having a circular guide-rim upon which the rim of the disk is adapted to fit and turn, a belt fitting around a rim of the movable disk, and means by which it is actuated to revolve the disk with relation to the support.

5. A fruit-pitting device consisting of vertically-disposed parallel plates fixed upon a table or support and having circular openings made through them, a circular flange projecting from the face of one of said plates having a center eccentric to that of the openings made through the plates, a circular disk having a flange fitting over the first-named flange and turnable thereon and an opening made through it corresponding with those of the aforementioned plates, elastic curved blades projecting into the opening of said disk adapted to encircle the pit when the fruit is introduced, and a band passing around the periphery of the revoluble disk, and a treadle with which said band is connected and whereby the carrying and pitting disks are revoluble.

6. The combination in a fruit-pitting apparatus of a pair of vertical parallel plates with circular openings in line a circular disk with a corresponding opening and knives fixed to project into one side of said opening, a guide eccentric to the openings about which the disk is turnable and segments fixed on each side of the openings of the exterior plates to support the fruit while being acted upon by the revoluble disk.

7. A fruit-pitter consisting of vertical parallel fixed plates, a disk mounted and revoluble between the fixed plates, openings through the plates eccentric to the center of revolution of the disk blades fixed to the disk and projecting into the opening thereof to separate the meat from the pit when the disk is revolved, an arm fulcrumed to one of the fixed plates and a pin carried by the disk which engages the arm on the return movement of the disk and causes it to eject the pit.

In witness whereof I have hereunto set my hand.

OLIVER L. SCOTT.

Witnesses:
S. H. NOURSE,
GEO. H. STRONG.